United States Patent [19]

Nguyen et al.

[11] Patent Number: 4,931,919
[45] Date of Patent: Jun. 5, 1990

[54] SYSTEM FOR CONVERTING VARIABLE FREQUENCY MULTIPLE PHASE ALTERNATING CURRENT INTO CONSTANT FREQUENCY MULTIPLE PHASE ALTERNATING CURRENT WITH NEUTRAL

[75] Inventors: Vietson M. Nguyen; John J. Dhyanchand, both of Rockford, Ill.

[73] Assignee: Sundstrand Corp., Rockford, Ill.

[21] Appl. No.: 218,876

[22] Filed: Jul. 14, 1988

[51] Int. Cl.$^5$ .............................................. H02M 5/45
[52] U.S. Cl. ......................................... 363/37; 363/8; 363/48; 318/771
[58] Field of Search ............. 363/8, 35, 37, 39, 44–48, 363/87, 92, 126, 157, 159; 318/771

[56] References Cited

U.S. PATENT DOCUMENTS

| | | | |
|---|---|---|---|
| 3,109,976 | 11/1963 | Sichling | 363/37 |
| 3,324,374 | 6/1967 | Corey | 363/37 |
| 3,988,660 | 10/1976 | Ruch et al. | 363/124 |
| 4,314,322 | 2/1982 | Plow et al. | 363/48 |
| 4,555,751 | 11/1985 | Koga et al. | 363/126 |
| 4,651,266 | 3/1987 | Fujioka et al. | 363/37 |
| 4,675,802 | 6/1987 | Sugimoto | 363/164 |
| 4,686,619 | 8/1987 | Edwards | 363/48 |
| 4,716,515 | 12/1987 | Alexander | 363/37 |

OTHER PUBLICATIONS

Radio Amateurs Handbook, 1978, p. 5-5.

*Primary Examiner*—Peter S. Wong
*Attorney, Agent, or Firm*—Antonelli, Terry & Wands

[57] ABSTRACT

A system for converting variable frequency multiple phase current into multiple phase current of constant frequency with a neutral having a multiple phase inverter with a neutral (N) is disclosed. A first input (34) is connected to the multiple phase inverter for receiving pulses of a positive polarity. A second input (36) is connected to the multiple phase inverter for receiving pulses of a negative polarity. A variable frequency multiple phase source (12, 14 and 16) of alternating current applies current to a multiple phase transformer (80, 142 and 180). Current from the transformer is applied to a full-wave rectifier (96) which has a first group of diodes (112) which applies the positive pulses to the input (34). A second group of diodes (116) applies the negative pulses to the input (36). The ripple frequency $f_r$ present on the inputs to the multiple phase inverter with neutral is twice the frequency present in the prior art which permits the capacitance of filter capacitors (74, 76) to be reduced to permit effective shunting of the undesired ripple frequency $f_r$ to the neutral which results in a weight savings and lessening of energy at the ripple frequency $f_r$ being coupled to the inverter (38).

26 Claims, 5 Drawing Sheets

SYSTEM FOR CONVERTING VARIABLE FREQUENCY MULTIPLE PHASE ALTERNATING CURRENT INTO CONSTANT FREQUENCY MULTIPLE PHASE ALTERNATING CURRENT WITH NEUTRAL

TECHNICAL FIELD

The present invention relates to systems for converting variable frequency multiple phase current into multiple phase current of constant frequency with a neutral. More specifically, the present invention relates to systems of the foregoing type utilized in airframes where weight minimization is of extreme importance.

BACKGROUND ART

Figure 1:
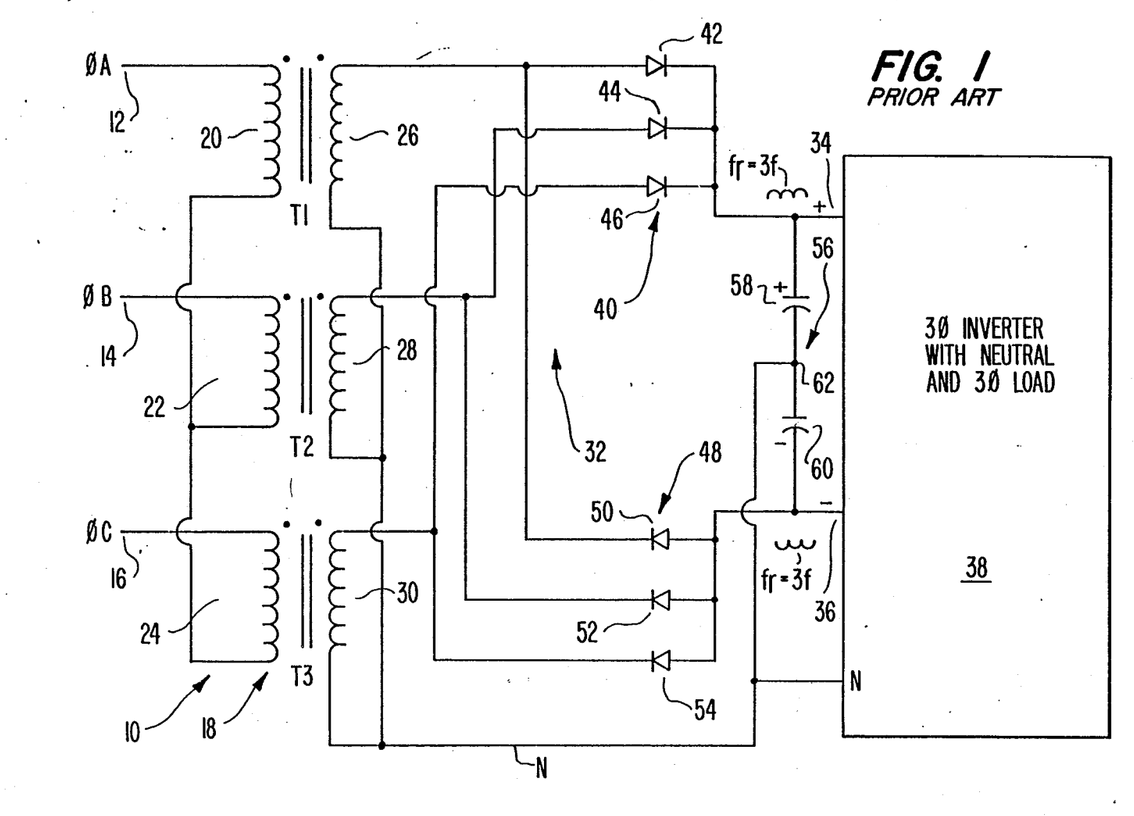
FIG. 1 illustrates a prior art system for converting variable frequency multiple phase current into multiple phase current of constant frequency.

FIG. 1 illustrates a prior art system 10 for converting variable frequency multiple phase alternating current into multiple phase current of constant frequency. The system 10 has three inputs 12, 14 and 16 which are respectively from phases A, B and C of a variable frequency source of alternating current such as a three phase alternator driven by a power take-off without speed regulation from a propulsive engine in an airframe. A three phase transformer having primary windings 20, 22 and 24 and secondary windings 26, 28 and 30 is utilized to process the multiple phase current as follows. A first terminal of the secondary windings 28, 30 and 32 is coupled to the neutral N and the second terminal of the windings respectively provides a phase output with each of the phase outputs from the secondary windings respectively being phase displaced by 120°. A full-wave rectifier 32 functions to apply pulsating current to the positive input 34 and the negative input 36 of a conventional three phase inverter with neutral and three phase load 38. The three phase load may be an unbalanced load on which current on the neutral N flows. A first group of diodes 40 consisting of diodes 42, 44 and 46 poled in a first direction applies pulsating positive current to the positive input 34 which has a frequency 3f with respect to neutral 62 where f is the fundamental frequency of the three phases of current inputted on the three phases 12, 14 and 16. Similarly, a second group of diodes 48, poled in the opposite direction to the diodes 40, consisting of diodes 50, 52 and 54 applies negative pulsating current to the input 36 at a frequency 3f with respect to the neutral as described above. A series circuit 56 consisting of capacitors 58 and 60 connects the positive input 34 to the negative input 36. Junction 62 is coupled to the neutral N.

The capacitors 58 and 60 function as filter capacitors to shunt the ripple frequency 3f to the neutral to prevent the application of substantial current at the ripple frequency to the three phase inverter with neutral and three phase load 38 which would cause the generation of undesired harmonics. In order to insure that the undesired ripple current at frequency 3f is shunted to the neutral, a relatively large capacitance must be used. This relatively large capacitance represents a weight penalty which could be minimized if the undesired ripple frequency of a higher frequency was present. Accordingly, the utilization of the prior art system for converting variable frequency multiple phase current into multiple phase current of constant frequency as illustrated in FIG. 1 is disadvantageous in airframes as a consequence of the weight penalty involved with the capacitances 58 and 60.

DISCLOSURE OF THE INVENTION

The present invention is a system for converting variable frequency multiple phase current into multiple phase current of constant frequency with a neutral having reduced weight which is of importance in power supplies utilized in airframes. With the invention, the ripple frequency of pulsating DC current applied to the positive and negative inputs of a three phase inverter with neutral by a full-wave rectifier is doubled over the ripple frequency of the prior art. Doubling of the ripple frequency enables the filter capacitors to be downsized thereby saving weight in the overall system giving consideration to the increased number of diodes as described below. The magnitude of the ripple current is proportionately less than in the prior art with the energy of the ripple current being reduced. Lessening the energy of the ripple current further promotes proper operation of the inverter.

A system for converting variable frequency multiple phase current into multiple phase current of constant frequency with a neutral having a multiple phase inverter with a neutral includes a first input to the multiple phase inverter receiving pulses of a first polarity; a second input to the multiple phase inverter receiving pulses of a second polarity; a variable frequency multiple phase source of alternating current; a pair of capacitors coupled in a series circuit with the series circuit having a first terminal coupled to the first input, a second terminal coupled to the second input and a junction between the pair of capacitors being coupled to the neutral; and means coupled to the variable frequency multiple phase source of alternating current for providing the pulses of the first polarity to the first input and providing the pulses of the second polarity to the second input, the ripple frequency $f_r$ of the pulses being equal to 2nf with respect to the neutral wherein n is the number of phases of the variable frequency multiple phase source of alternating current and f is a fundamental frequency of the variable frequency multiple phase alternating current. The means for providing pulses includes a full-wave rectifier having inputs coupled to each of the phases of the variable frequency multiple phase source of alternating current and first and second outputs respectively coupled to the first and second inputs.

A system for converting variable frequency multiple phase current into multiple phase current of constant frequency with a neutral in accordance with the invention includes a multiple phase transformer having a plurality of inputs equal to a number of phases present in the variable frequency multiple phase current which are respectively connected to different primary windings, a plurality of secondary windings each respectively magnetically coupled to a different primary winding and each having a pair of terminals, the neutral being coupled to a center tap of each of the secondary windings; a full-wave rectifier having inputs respectively coupled to a different one of the terminals of the secondary windings and first and second outputs respectively coupled to first and second inputs of a multiple phase inverter, the first input receiving positive pulses and the second input receiving negative pulses; a pair of capacitors coupled in a series circuit with the series circuit having a first terminal coupled to the first input, a second terminal coupled to the second input and a junction between the pair of capacitors being coupled to the neutral; and the ripple frequency $f_r$ of the pulses being equal to 2nf with respect to the neutral wherein n is the number of phases of the variable frequency multiple phase current and f is the fundamental frequency of the variable frequency multiple phase current. The full-wave rectifier comprises a first group of diodes poled in a first direction with each diode of the first group having an anode respectively coupled to a different terminal of the secondary windings and a cathode coupled to the first input with the diodes of the first group being equal in number to the number of secondary terminals; and a second group of diodes poled in a second direction, opposite to the first direction, with each diode of the second group having a cathode respectively coupled to a different terminal of the secondary windings and an anode coupled to the second input with the diodes of the second group being equal in number to the number of the secondary terminals. Preferably, the system has three phases. The neutral may be connected to each of the primary windings.

Each of the phases of the transformer may be an autotransformer. The autotransformer may comprise a magnetically permeable core having a plurality of parallel legs with each leg being wrapped with a different phase winding and magnetically permeable sections connecting the parallel legs; each phase winding having a single winding with first and second primary winding terminals being respectively for connection to a phase of the multiple phase current of variable frequency and to the neutral and the terminals of the secondary being connected to the winding with the neutral being connected to the winding between the terminals of the secondary winding. The secondary terminals may be connected to a portion of the winding which is not between the first and second primary winding terminals.

A system for converting variable frequency multiple phase curren into multiple phase current of constant frequency with a neutral in accordance with the invention includes a multiple phase transformer having a plurality of inputs equal to a number of phases present in the variable frequency current which are respectively connected to different primary windings, a plurality of secondary windings each respectively magnetically coupled to a different primary winding and having a pair of terminals, the neutral being coupled to each of the primary and the secondary windings; a full-wave rectifier having inputs coupled to each of the primary windings and to one of the first and second terminals of the secondary windings and first and second outputs respectively coupled to first and second inputs of a multiple phase inverter, the first input receiving positive pulses and the second input receiving negative pulses; a pair of capacitors coupled in a series circuit with the series circuit having a first terminal coupled to the first input, a second terminal coupled to the second input and a junction between the pair of capacitors being coupled to the neutral; and the ripple frequency $f_r$ of the pulses being equal to 2nf with respect to the neutral wherein n is the number of phases of the variable frequency multiple phase current and f is a fundamental frequency of the variable frequency multiple phase current. The full-wave rectifier comprises a first group of diodes poled in a first direction with half of the first group of diodes each having an anode respectively coupled to one of the terminals of a different secondary winding and a cathode coupled to the first input and a remaining half of the diodes of the first group having an anode respectively coupled to a different one of the primary windings at a point displaced from the phase input and a cathode coupled to the first input; and a second group of diodes poled in a second direction, opposite to the first direction, with half of the second group of diodes each having a cathode respectively coupled to one of the terminals of a different secondary winding and an anode coupled to the second input and a remaining half of the diodes of the second group each having a cathode respectively coupled to a different one of the primary windings at a point displaced from the phase input and an anode coupled to the second input. The neutral is connected to each of the primary windings and to each of the secondary windings. Wire contained in a portion of the primary winding between the point displaced from the phase input and the neutral may be lighter than wire contained in a remainder of the primary winding as a consequence of reduced magnitude of current flow through the portion.

BEST MODE FOR CARRYING OUT THE INVENTION

Figure 2:
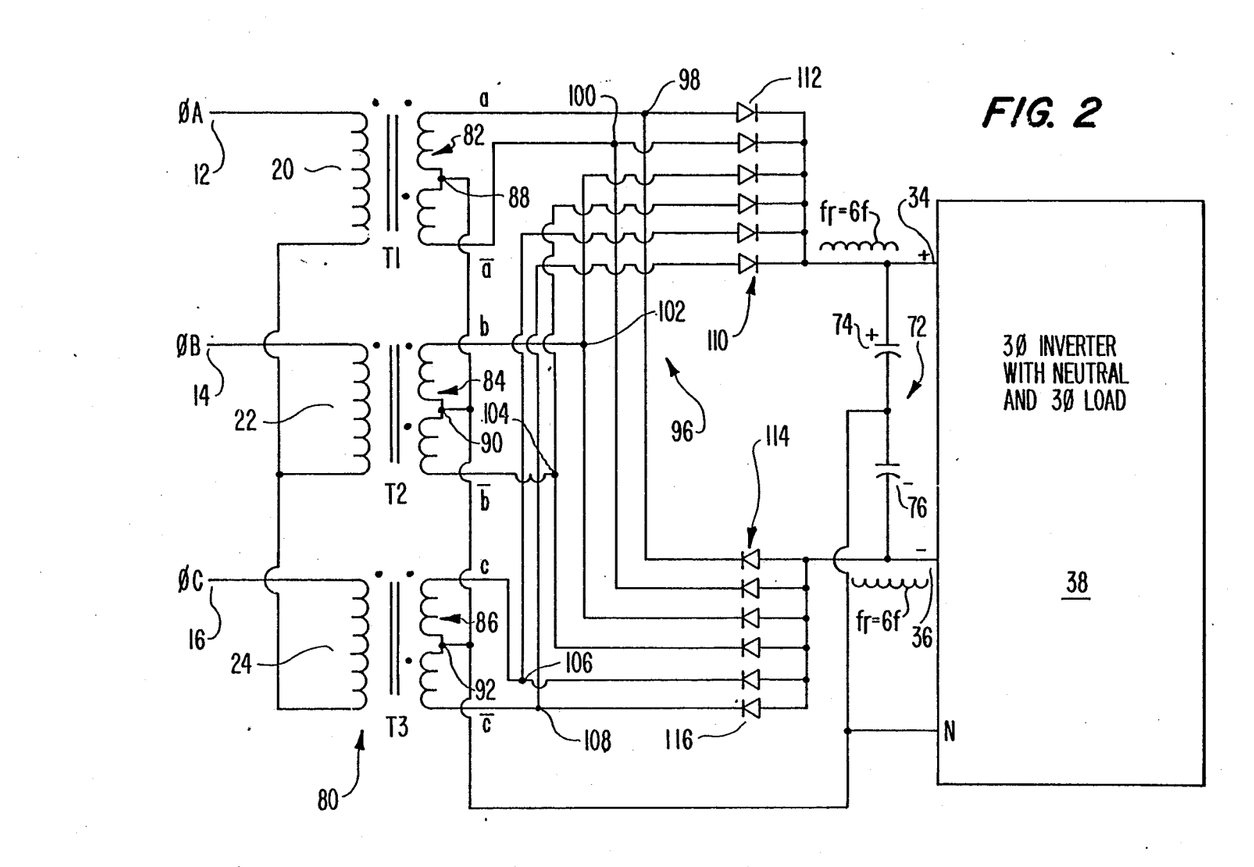
FIG. 2 illustrates a first embodiment of the invention.

FIG. 2 illustrates a first embodiment of the present invention. Like parts in each of the FIGS. are identified by like reference numerals. The present invention differs from the prior art illustrated in FIG. 1 in that the ripple frequency $f_r$ applied to the positive input 34 and negative input 36 of the three phase inverter with neutral and three phase load 38 is twice the frequency of that described above with reference to the prior art. The mathematical relationship for defining the relationship between the ripple frequency present on the inputs 34 and 36 with respect to the neutral in the embodiments of the present invention is stated as $f_r = 2nf$ wherein n is the number of phases of the variable frequency multiple phase current and f is a fundamental frequency of the variable frequency multiple phase current present on each of the phases 12, 14, and 16. By doubling the ripple frequency $f_r$, the series circuit 72 comprised of capacitors 74 and 76 may be reduced in mass as a consequence of the capacitance necessary to shunt the undesired ripple frequency $f_r$ to the neutral N being cut in half. Furthermore, the magnitude of the ripple current $f_r$ is reduced with respect to the magnitude described above with reference to the prior art which couples less energy at the ripple frequency $f_r$ to the inverter 38. Lessening the magnitude of the ripple current $f_r$ coupled to the inverter 38 improves operation by minimizing the generation of undesired harmonics. This halving of the capacitance of the capacitor 74 and 76 more than compensates for the weight of additional diodes in the full-wave rectifier as described below. Transformer 80 has three separate phases with primary windings 20, 22 and 24 being respectively magnetically coupled to secondary windings 82, 84 and 86. Secondary winding 82 has a center tap 88 connected to the neutral N. Secondary winding 84 has a center tap 90 connected to the neutral N. Secondary winding 86 has a center tap 92 connected to the neutral. A full-wave rectifier 96 connects the output terminals 98, 100, 102, 104, 106 and 108 of the secondary windings 82, 84 and 86 to the positive input 34 and the negative input 36 of the three phase inverter with neutral and three phase load 38. A first half 110 of the three phase rectifier 96, is comprised of six diodes 112 which are poled in a first direction between the outputs 98–108 of the secondary windings 82, 84 and 86 and the input 34. A second half 114 of the full-wave rectifier 96 is comprised of six diodes 116, which are poled in a direction opposite to the diodes 112 and which are connected between the outputs 98–108 and the negative input 36 of the three phase inverter with neutral and three phase load 38. The first half 110 of the full-wave rectifier functions to produce a ripple frequency $f_r$ at 6f with respect to the neutral N wherein f is the fundamental frequency of each of the phases A, B and C on the phase inputs 12, 14 and 16. Similarly, the second half 114 functions to produce a ripple frequency $f_r$ at the ripple frequency 6f with respect to the neutral N on the input 36 of the three phase inverter with neutral and three phase load 38. It is thus seen that the ripple frequency $f_r$ is doubled over that present in the prior art which results in the capacitance of the capacitors 74 and 76 being halved which provides weight savings which are especially important for applications involving airframes and further lessens the energy of the ripple current $f_r$ which is coupled to the inverter 38 to minimize the generation of undesired harmonics.

Figure 3:
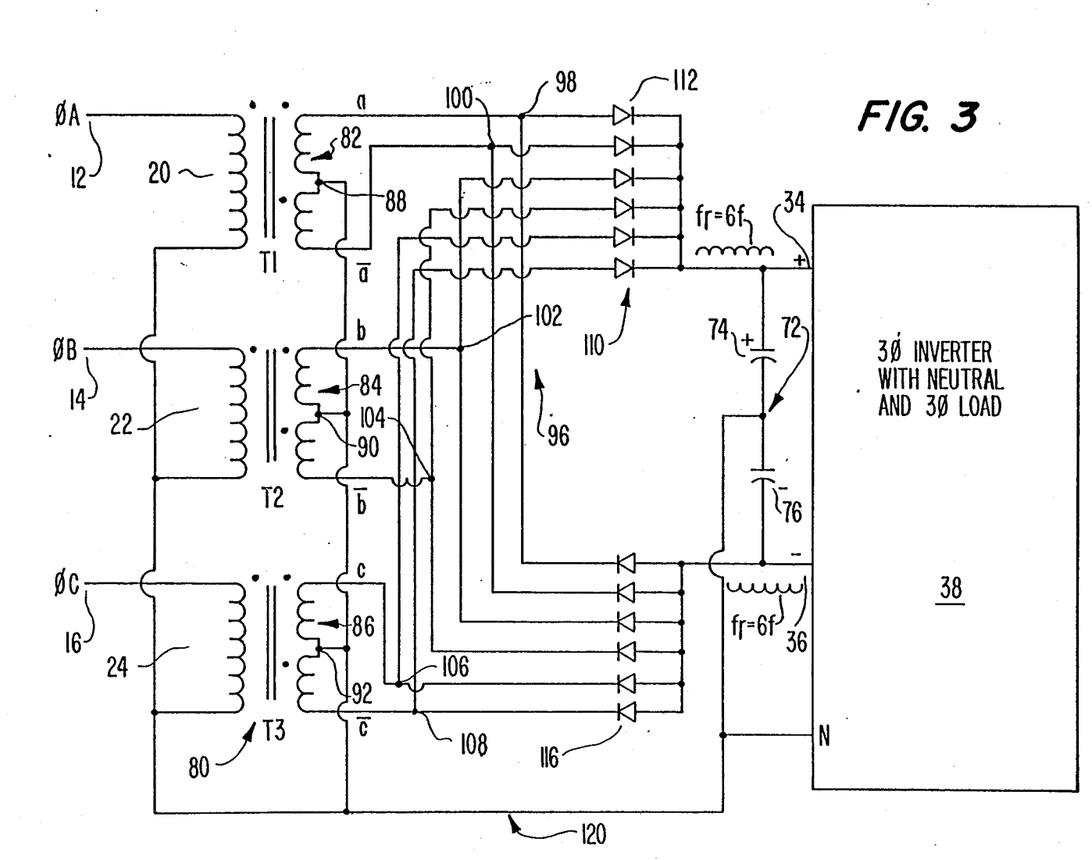
FIG. 3 illustrates a second embodiment of the invention.

FIG. 3 illustrates a second embodiment 120 of the present invention. Like parts are identified by like reference numerals in FIGS. 2 and 3. The only difference between the embodiments in FIGS. 2 and 3 is that in FIG. 3 the primary windings 20, 22 and 24 are connected to the neutral N. This embodiment otherwise functions in a manner identical to that illustrated in FIG. 2. Accordingly, the embodiment of FIG. 3 will not be further described.

Figure 4:
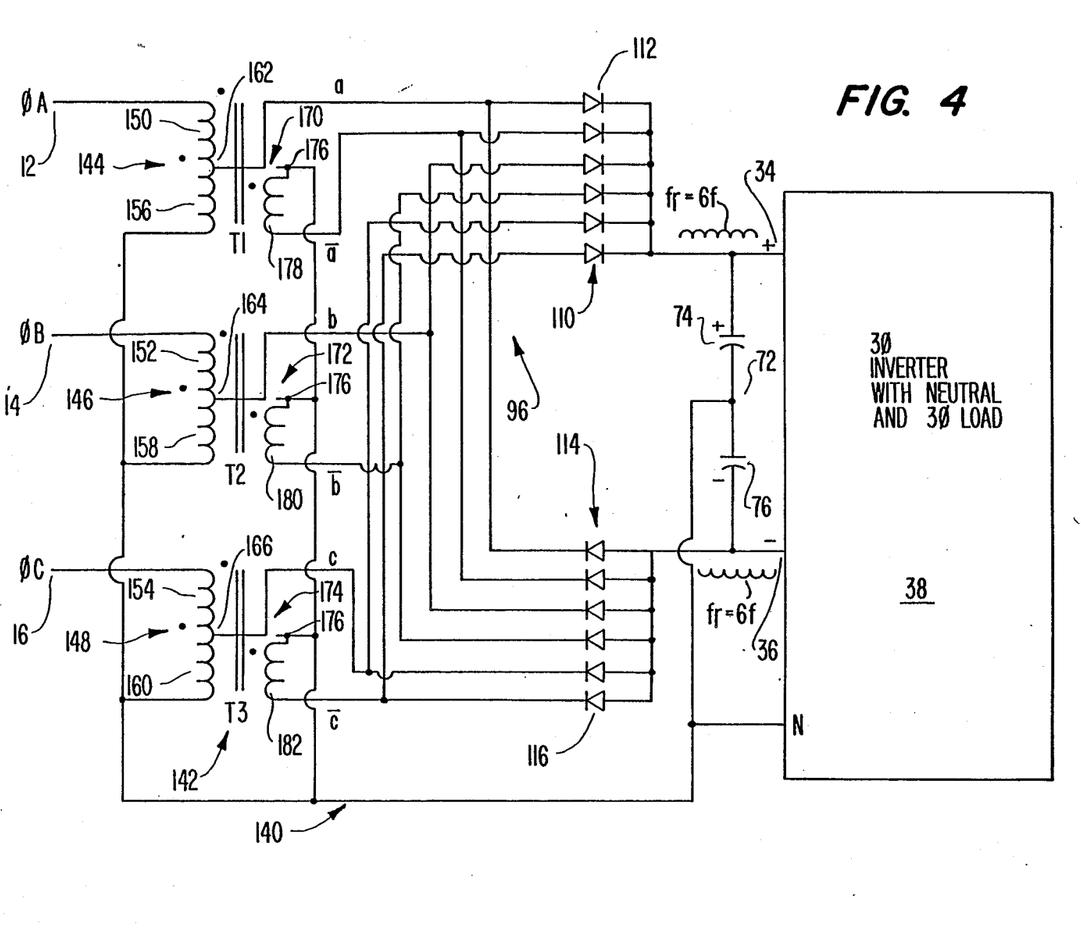
FIG. 4 iillustrates a third embodiment of the present invention.

FIG. 4 illustrates a third embodiment of the present invention. Like parts are identified by like reference numerals in FIGS. 2-4. FIG. 4 differs principally in the construction of the three phase transformer 142. The primary windings 144, 146 and 148 differ from the primaries 20, 22 and 24 of the first two embodiments in that the first half 150, 152 and 154 of the primary windings respectively of the primaries 144, 146, and 148 carry the majority of the current from the three phase inputs 12, 14 and 16. The second half 156, 158 and 160 of the primary windings 144, 146 and 148 respectively carry magnetization current and diminished load current which permits them to be wound with a smaller diameter wire to achieve a weight savings. Center taps 162, 164 and 166 are respectively connected to the primary windings 144, 146 and 148. The terminals 162, 164 and 166 of the primary windings 144, 146 and 148 are each connected to the anode of a different one of the diodes 112 and the cathode of a different one of the diodes 116. The secondary windings 170, 172 and 174 each have a first terminal 176 which is connected to the neutral N. The second terminal 178 of the secondary winding 170 is connected to the anode of one of the diodes 112 and to the cathode of one of the diodes 116. The second terminal 180 of the secondary winding 172 is connected to the anode of one of the diodes 112 and to the cathode of one of the diodes 116. The second terminal 182 of the secondary winding 174 is connected to the anode of one of the diodes 112 and to the cathode of one of the diodes 116. The embodiment 140 functions identically to the preceding embodiments described above in producing positive pulses of current at the input 34 and negative pulses of current at the input 36 of a ripple frequency $f_r$ of 6f. The advantage of the embodiment of FIG. 4 is that there is a weight savings achieved by not carrying substantial current in half of the primary windings which permits smaller diameter wire to be utilized in the portions 156, 158 and 160 of the primary windings 144, 146 and 148, respectively.

The three embodiments described above illustrate the usage of transformers 80 and 142, respectively, which are not autotransformers. However, it should be understood that the present invention is not limited to the utilization of transformers with separate primary and secondary magnetically linked windings with each of the embodiments being subject to practice with autotransformers.

Figure 5:
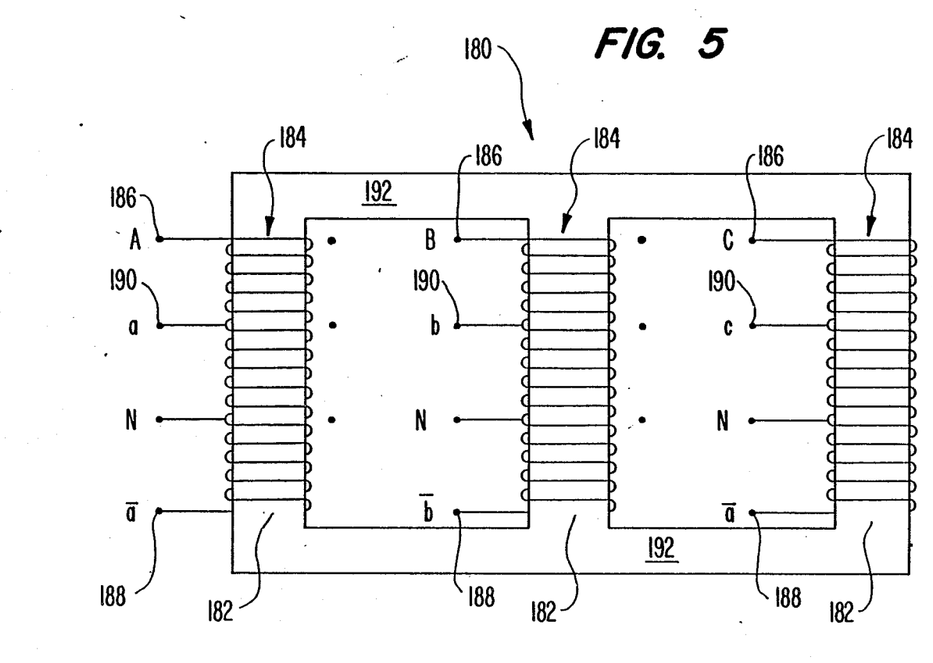
FIG. 5. illustrates an autotransformer which may be utilized with the second embodiment of the present invention.

FIG. 5 illustrates an autotransformer 180 which may be utilized with the embodiment of FIG. 3. It should be further understood that an autotransformer having a design similar to that illustrated in FIG. 5 may be utilized in the practicing of the embodiments illustrated in FIGS. 2 and 4 with the making of suitable modifications where necessary including the removal of the neutral N. The autotransformer 180 has a number of parallel legs 182 which are magnetically permeable which are equal in number to the number of phases of the current applied to the input of the transformer. The letter convention illustrated in FIG. 5 of letters A, B, C, a, b, c, $\bar{a}$, $\bar{b}$, $\bar{ac}$, and N is identical to the letter convention illustrated in FIGS. 2, 3 and 4. Each leg 182 has a winding 184 with a first terminal 186 which is connected to one of the phase sources 12, 14 and 16. The neutral N is connected to the winding 184 at a point intermediate the terminal 188 which respectively in the different legs 182 is connected to a different one of the outputs of the secondary. The terminal 190 in each of the legs 182 is connected to the other terminal of the secondary. As illustrated, the secondary terminals 188 and 190 are connected to a portion of the winding 184 which is not between the first and second primary winding terminals 186 and N. Magnetically permeable sections 192 magnetically link the parallel legs 182.

While the invention has been described in terms of its preferred embodiments, it should be understood that numerous modifications may be made thereto without departing from the spirit and scope of the present invention. For example, while the present invention is illustrated as having three phases, it should be understood that the invention is applicable to any variable frequency multiple phase system in which variable frequency current is to be converted to constant frequency multiple phase current by a multiple phase inverter. Furthermore, it should be understood that the invention may be practiced with any suitable design of a three phase inverter having positive and negative inputs to which are applied pulses of DC current and a neutral connected to a three phase load which is connected to outputs of the three phase inverter. A multiple phase load of any design may be connected to phase output terminals (not illustrated) of the three phase inverter with neutral and three phase load 38. Furthermore, the invention may be practiced with different designs of neutral forming circuits.

We claim:

1. A system for converting variable frequency multiple phase current into multiple phase current of constant frequency with a neutral comprising:
   a multiple phase transformer having a plurality of inputs equal to a number of phases present in the variable frequency current which are respectively connected to different primary windings, a plurality of secondary windings each respectively magnetically coupled to a different primary winding and having a pair of terminals, the neutral being coupled to a center tap of each of the secondary windings;
   a single full-wave rectification means having inputs coupled to each of the first and second terminals of the secondary windings and first and second outputs respectively coupled to first and second inputs of a multiple phase inverter, the first input receiving positive pulses and the second input receiving negative pulses, the pulses having a frequency $f_r$ equal to $2nf$ with respect to the neutral wherein n is the number of phases of the variable frequency multiple phase current and f is a fundamental frequency of the variable frequency multiple phase current; and
   a pair of capacitors coupled in a series circuit with the series circuit having a first terminal coupled to the first input, a second terminal coupled to the second input and a junction between the pair of capacitors being coupled to the neutral.

2. A system in accordance with claim 1 wherein the full-wave rectification means comprises:
   a first group of diodes poled in a first direction with each diode of the first group having an anode respectively coupled to a different terminal of the secondary windings and a cathode coupled to the first input with the diodes of the first group being equal in number to the number of secondary terminals; and
   a second group of diodes poled in a second direction, opposite to the first direction, with each diode of the second group having a cathode respectively coupled to a different terminal of the secondary windings and an anode coupled to the second input with the diodes of the second group being equal in number to the number of the secondary terminals.

3. A system in accordance with claim 1 wherein: the system has three phases.

4. A system in accordance with claim 1 wherein: the neutral is connected to each of the primary windings.

5. A system in accordance with claim 2 wherein: the neutral is connected to each of the primary windings.

6. A system in accordance with claim 3 wherein: the neutral is connected to each of the primary windings.

7. A system in accordance with claim 1 wherein: each phase of the transformer is an autotransformer.

8. A system in accordance with claim 2 wherein: each phase of the transformer is an autotransformer.

9. A system in accordance with claim 3 wherein: each phase of the transformer is an autotransformer.

10. A system in accordance with claim 4 wherein: each phase of the transformer is an autotransformer.

11. A system in accordance with claim 5 wherein: each phase of the transformer is an autotransformer.

12. A system in accordance with claim 6 wherein: each phase of the transformer is an autotransformer.

13. A system in accordance with claim 10 wherein the autotransformer comprises:
    a magnetically permeable core having a plurality of parallel legs with each leg being wrapped with a different phase winding and magnetically permeable sections connecting the parallel legs; and
    each phase winding having a single winding with first and second primary winding terminals being respectively for connection to a phase of multiple phase current of variable frequency and to the neutral and the terminals of the secondary being connected to the winding with the neutral being connected to the winding between the terminals of the secondary winding.

14. A system in accordance with claim 13 wherein:
    the secondary terminals are connected to a portion of the winding which is not between the first and second primary winding terminals.

15. A system in accordance with claim 11 wherein the autotransformer comprises:
    a magnetically permeable core having a plurality of parallel legs with each leg being wrapped with a different phase winding and magnetically permeable sections connecting the parallel legs; and
    each phase winding having a single winding with first and second primary winding terminals being respectively for connection to a phase of multiple phase current of variable frequency and to the neutral and the terminals of the secondary being connected to the winding with the neutral being connected to the winding between the terminals of the secondary winding.

16. A system in accordance with claim 15 wherein:
    the secondary terminals are connected to a portion of the winding which is not between the first and second primary winding terminals.

17. A system in accordance with claim 12 wherein the autotransformer comprises:
    a magnetically permeable core having a plurality of parallel legs with each leg being wrapped with a different phase winding and magnetically permeable sections connecting the parallel legs; and
    each phase winding having a single winding with first and second primary winding terminals being respectively for connection to a phase of multiple phase current of variable frequency and to the neutral and the terminals of the secondary being connected to the winding with the neutral being connected to the winding between the terminals of the secondary winding.

18. A system in accordance with claim 17 wherein:
    the secondary terminals are connected to a portion of the winding which is not between the first and second primary winding terminals.

19. A system for converting variable frequency multiple phase current into multiple phase current of constant frequency with a neutral comprising:
    a multiple phase transformer having a plurality of inputs equal to a number of phases present in the variable frequency multiple phase current which are respectively connected to different primary windings, a plurality of secondary windings each respectively magnetically coupled to a different primary windings and having a pair of terminals, the neutral being coupled to each of the primary and secondary windings;
    a single full-wave rectification means having inputs coupled to each of the primary windings and to one of the first and second terminals of the secondary windings and first and second outputs respectively coupled to first and second inputs of a multiple phase inverter, the first input receiving positive pulses and the second input receiving negative pulses, a frequency of the pulses $f_r$ being equal to $2nf$ with respect to the neutral wherein n is the number of phases of the variable frequency multiple phase current and f is a fundamental frequency of the variable frequency multiple phase current; and a pair of capacitors coupled in a series circuit with the series circuit being a first terminal coupled to the first input, a second terminal coupled to the second input and a junction between the pair of capacitors being coupled to the neutral.

20. A system in accordance with claim 19 wherein the full-wave rectification means comprises:

a first group of diodes poled in a first direction with half of the first group of diodes each having an anode respectively coupled to one of the terminals of a different secondary winding and a cathode coupled to the first input and a remaining half of the diodes having an anode respectively coupled to a different one of the primary windings at a point displaced from the phase input and a cathode coupled to the first input; and a second group of diodes poled in a second direction, opposite to the first direction, with half of the second group of diodes each having a cathode respectively coupled to one of the terminals of a different secondary winding and an anode coupled to the second input and a remaining half of the diodes each having a cathode respectively coupled to a different one of the primary windings at a point displaced from the phase input and an anode coupled to the second input.

21. A system in accordance with claim 20 wherein:
wire contained in a portion of the primary winding between the point displaced from the phase input and the neutral is lighter than wire contained in a remainder of the primary winding.

22. A system in accordance with claim 20 wherein:
the neutral is connected to each of the primary windings at a center tap and to each of the secondary windings at an output terminal.

23. A system for converting variable frequency multiple phase current into multiple phase current of constant frequency with a neutral having a multiple phase inverter with a neutral comprising:

a first input to the multiple phase inverter receiving pulses of a first polarity;

a second input to the multiple phase inverter receiving pulses of a second polarity;

a variable frequency multiple phase source of alternating current;

a pair of capacitors coupled in a series circuit with the series circuit having a first terminal coupled to the first input, a second terminal coupled to the second input and a junction between the pair of capacitors being coupled to the neutral; and a single rectification means, coupled to the variable frequency multiple phase source of alternating current, for providing the pulses of the first polarity to the first input and for providing the pulses of the second polarity to the second input, the frequency $f_r$ of the pulses being equal to $2nf$ with respect to the neutral wherein n is the number of phases of the variable frequency multiple phase current and f is a fundamental frequency of the variable frequency multiple phase current.

24. A system in accordance with claim 23 wherein the means for providing pulses comprises:

a full-wave rectification means having inputs coupled to each of the phases of the variable frequency multiple phase source of alternating current and first and second outputs respectively coupled to the first and second inputs.

25. A system for converting variable frequency multiple phase current into multiple phase current of constant frequency comprising:

a multiple phase transformer having a plurality of inputs equal to a number of phases present in the variable frequency current which are respectively connected to different primary windings, a plurality of secondary windings each respectively magnetically coupled to a different primary winding and having a pair of terminals;

a single full-wave rectification means having inputs coupled to each of the first and second terminals of the secondary windings and first and second outputs respectively coupled to first and second inputs of a multiple phase inverter, the first input receiving positive pulses and the second input receiving negative pulses, the pulses having a frequency $f_r$ equal to $2nf$ with respect to a first reference point wherein n is the number of phases of the variable frequency multiple phase current and f is a fundamental frequency of the variable frequency multiple phase current; and a pair of capacitors coupled in a series circuit with the series circuit having a first terminal coupled to the first input, a second terminal coupled to the second input and a junction between the pair of capacitors being coupled to a second reference point.

26. A system for converting variable frequency multiple phase current into multiple phase current for constant frequency having a multiple phase inverter comprising:

a first input to the multiple phase inverter receiving pulses of a first polarity;

a second input to the multiple phase inverter receiving pulses of a second polarity;

a variable frequency multiple phase source of alternating current;

a pair of capacitors coupled in a series circuit with the series circuit having a first terminal coupled to the first input, a second terminal coupled to the second input and a junction between the pair of capacitors being coupled to a first reference point; and a single fullwave rectification means, coupled to the variable frequency multiple phase source of alternating current, for providing the pulses of the first polarity to the first input and for providing the pulses of the second polarity to the second input, the frequency $f_r$ of the pulses being equal to $2nf$ with respect to a second reference point wherein n is the number of phases of the variable frequency multiple phase current and f is a fundamental frequency of the variable frequency multiple phase current.

* * * * *